United States Patent
Yoshiya

(10) Patent No.: US 12,351,680 B2
(45) Date of Patent: Jul. 8, 2025

(54) POLYCARBONATE RESIN COMPOSITION

(71) Applicant: MITSUBISHI GAS CHEMICAL COMPANY, INC., Tokyo (JP)

(72) Inventor: Kohei Yoshiya, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 69 days.

(21) Appl. No.: 18/279,102

(22) PCT Filed: Mar. 2, 2022

(86) PCT No.: PCT/JP2022/008715
§ 371 (c)(1),
(2) Date: Aug. 28, 2023

(87) PCT Pub. No.: WO2022/186234
PCT Pub. Date: Sep. 9, 2022

(65) Prior Publication Data
US 2024/0166809 A1    May 23, 2024

(30) Foreign Application Priority Data
Mar. 4, 2021    (JP) ................................ 2021-034794

(51) Int. Cl.
| | | |
|---|---|---|
| *H01B 1/20* | (2006.01) | |
| *C08G 64/04* | (2006.01) | |
| *C08G 64/16* | (2006.01) | |
| *C08L 69/00* | (2006.01) | |
| *C09D 11/102* | (2014.01) | |
| *C09D 169/00* | (2006.01) | |
| *C09J 169/00* | (2006.01) | |

(52) U.S. Cl.
CPC .............. *C08G 64/16* (2013.01); *C08L 69/00* (2013.01); *C09D 11/102* (2013.01); *C09D 169/00* (2013.01); *C09J 169/00* (2013.01); *H01B 1/20* (2013.01)

(58) Field of Classification Search
CPC ... H01B 1/20; H01B 1/22; H01B 1/24; C08G 64/04; C08L 69/00
See application file for complete search history.

(56) References Cited

U.S. PATENT DOCUMENTS 5,506,302 A    4/1996   Shiono et al.
6,664,313 B2 * 12/2003  Hirai ....................... C08L 69/00
                                                    524/269

FOREIGN PATENT DOCUMENTS

| CN | 105062306 A | * | 11/2015 |
| CN | 109689784 A | * | 4/2019 |
| EP | 0 643 106 A2 | | 9/1994 |
| JP | 4-268365 A | | 9/1992 |
| JP | 7-126530 A | | 5/1995 |
| JP | 2006-070065 A1 | | 3/2006 |
| JP | 2008-101191 A | | 5/2008 |
| JP | 2014-24789 A | | 2/2014 |
| JP | 2014-139300 A | | 7/2014 |
| JP | 6340811 B2 | | 6/2018 |
| WO | 2015/146659 A1 | | 10/2015 |

OTHER PUBLICATIONS

Wen et al "Abrasion Resistant Inorganic/Organic Coating Materials Prepared by the Sol-Gel Method", Journal of Sol-Gel Science and Technology, 5, 115-126 (1995).*
English language machine translation of JP 2006-070065 (pub date 2006).*
English language machine translation of JP 2008-101191 (pub date 2008).*
International Search Report issued May 10, 2022 in International Bureau of Wipo Patent Application No. PCT/JP2022/008715, with an English translation thereof.
Written Opinion issued May 10, 2022 in International Bureau of WIPO Patent Application No. PCT/JP2022/008715, with an English translation thereof.
Supplementary European Search Report dated Sep. 4, 2024 in European family member application No. 22 76 3288.2.

* cited by examiner

*Primary Examiner* — Mark Kopec
(74) *Attorney, Agent, or Firm* — GREENBLUM & BERNSTEIN, P.L.C.

(57) ABSTRACT

A polycarbonate resin composition contains (A) a polycarbonate resin containing a structural unit that is represented by general formula (1) and (B) a silane coupling agent that is represented by general formula (2), wherein 0.06 part by mass or more of the silane coupling agent (B) is contained relative to 100 parts by mass of the polycarbonate resin (A).

16 Claims, No Drawings

POLYCARBONATE RESIN COMPOSITION

TECHNICAL FIELD

The present invention relates to a polycarbonate resin composition and the like, and more particularly to a polycarbonate resin composition which can be used in a polycarbonate coating resin solution with excellent adhesiveness to a base material, and the like.

BACKGROUND ART

Polycarbonate resins have excellent transparency and formability as well as excellent mechanical properties such as impact resistance and thus are used in electrical products and other mechanical products such as automobiles. Among them, polycarbonate resin solutions for obtaining a thin film with functional properties and for coating articles are known (Patent literature 1).

Coatings resulting from polycarbonate resin solutions are excellent in durability such as impact resistance but inferior in adhesiveness, and thus, taking advantage of this property, their application to easily peelable polish is known (Patent literature 2). Accordingly, there is room for improvement in the adhesiveness between these coating films and base materials.

As a resin composition obtained by blending a polycarbonate resin with other resin, for example, a blend resin composition of a polycarbonate resin and a polyphenylene ether resin is known, but this blend resin composition does not improve adhesiveness (Patent literature 3). Therefore, it is still desirable to develop a polycarbonate resin composition that can improve adhesiveness between the coating film and the base material.

PRIOR ART DOCUMENTS

Patent Documents

Patent literature 1: Japanese Unexamined Patent Application Publication No. H4(1992)-268365
Patent literature 2: Japanese Unexamined Patent Application Publication No. 2014-024789
Patent literature 3: Japanese Patent No. 6340811

SUMMARY OF THE INVENTION

Problems to be Solved by the Invention

The present invention provides a blend resin composition of a polycarbonate resin and other component, which can improve adhesiveness between a coating film and a base material, and the like.

Means for Solving the Problems

As a result of diligent study, the present inventors have found that a blend resin composition of a specific polycarbonate resin and a silane coupling agent can be used in a solution for forming a strong coating film that is highly adhesive to a base material, thereby accomplishing the present invention. Examples of the base material include those formed of a wide range of materials including metals such as stainless steel and glass.

Thus, the present invention includes the following aspects.

<1> A polycarbonate resin composition comprising a polycarbonate resin (A) comprising a structural unit represented by General formula (1) below and a silane coupling agent (B) represented by General formula (2) below, wherein the polycarbonate resin composition comprises 0.06 parts by mass or more of the silane coupling agent (B) per 100 parts by mass of the polycarbonate resin (A):

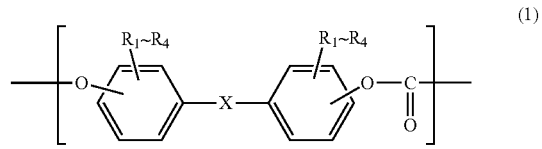

(in Formula (1), $R_1$-$R_4$ each independently represent hydrogen, fluorine, chlorine, bromine, iodine, or an optionally substituted C1-C20 alkyl group, C6-C12 aryl group, C2-C12 alkenyl group, C1-C5 alkoxy group, or C7-C17 aralkyl group, X represents a single bond, —O—, —S—, —SO—, —SO$_2$—, —CO—, or a divalent group represented by any of General formulae (4)-(9) below,

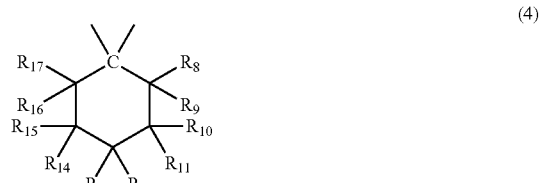

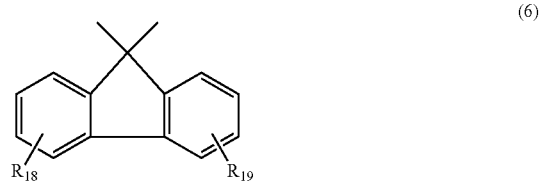

-continued

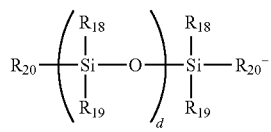 (9)

(in General formula (4), $R_8$-$R_{17}$ each independently represent hydrogen or a C1-C3 alkyl group, where at least one of $R_8$-$R_7$ represents a C1-C3 alkyl group; and
in General formulae (5) to (9),
$R_{18}$ and $R_{19}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group, or an optionally substituted C2-C15 alkenyl group, or
$R_{18}$ and $R_{19}$ bind with each other to form a C3-C20 carbon ring or a C1-C20 heterocyclic ring,
$R_{20}$ represents an optionally substituted C1-C9 alkylene group,
c represents an integer from 0 to 20, and
d represents an integer from 1 to 500);

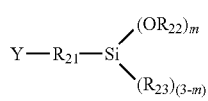 (2)

(in General formula (2),
$R_{21}$ represents a C1-C4 alkylene group or a phenylene group,
$R_{22}$ each independently represent a C1-C4 alkyl group,
$R_{23}$ each independently represent a hydroxyl group or a C1-C4 alkyl group,
Y represents an active group comprising an epoxy group, an isocyanate group, a vinyl group, a styryl group, an acryloyl group, a ureido group, an isocyanurate group, or a mercapto group, and
m each independently represent an integer from 1-3).
<2> The polycarbonate resin composition according to <1> above, wherein the terminal structure of the polycarbonate resin (A) is represented by General formula (3) below:

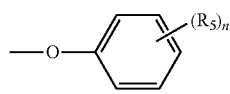 (3)

(in General formula (3),
$R_5$ each independently represent a C1-C8 alkyl group, which may be substituted by a hydroxyl group, and
n represents an integer from 0 to 5).
<3> The polycarbonate resin composition according to either one of <1> and <2> above, wherein X in General formula (1) above represents —O—, —S—, or General formula (4) or (5) above.
<4> The polycarbonate resin composition according to any one of <1> to <3> above, wherein General formula (1) above represents one or more selected from the group consisting of Formulae (10) to (22) below:

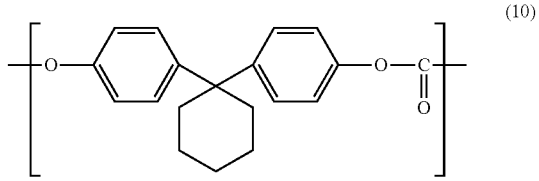 (10)

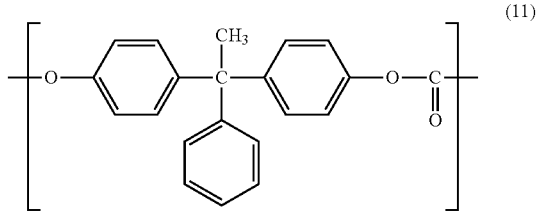 (11)

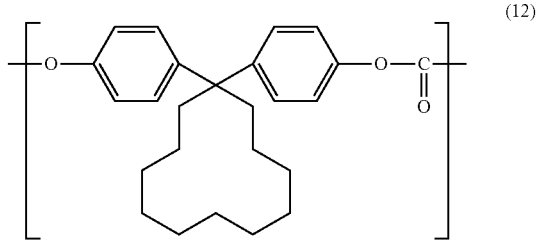 (12)

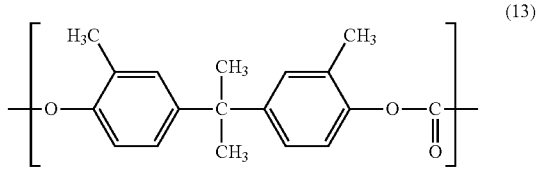 (13)

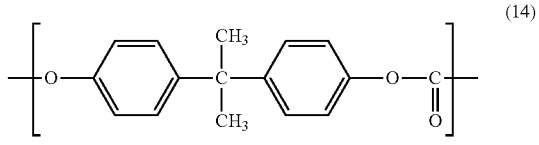 (14)

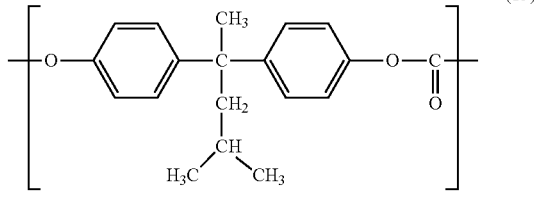 (15)

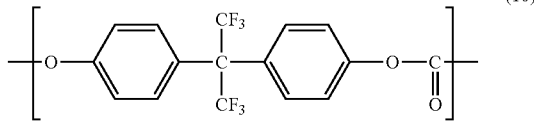 (16)

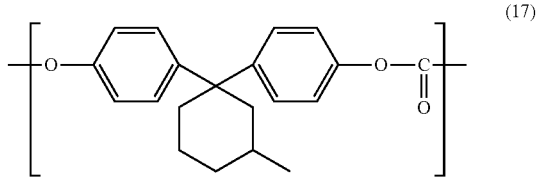 (17)

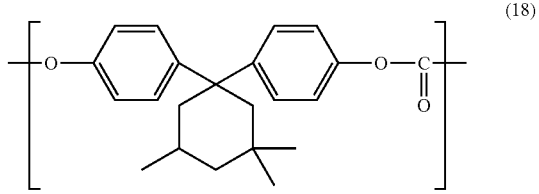 (18)

-continued

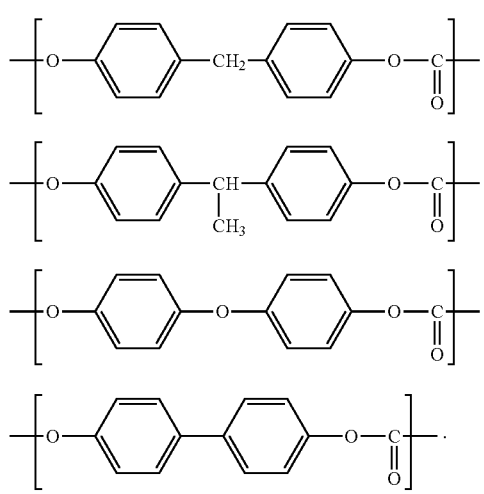

<5> The polycarbonate resin composition according to any one of <1> to <4> above, wherein the active group represented by Y in General formula (2) above has at least one of an epoxy group, an isocyanate group, and a vinyl group.

<6> The polycarbonate resin composition according to any one of <1> to <4> above, wherein the active group represented by Y in General formula (2) above comprises any of Formulae (i) to (ix) below:

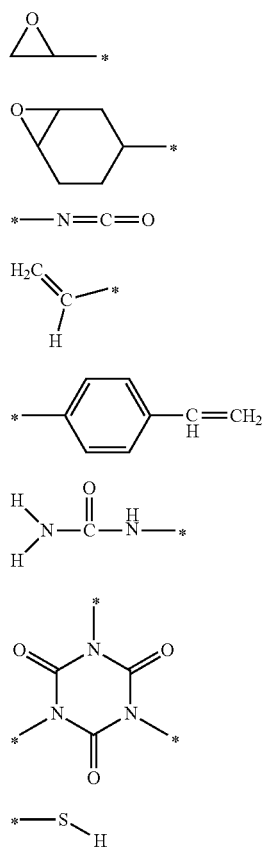

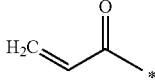

(in General formulae (i) to (ix),
* represents a bond point with $R_{21}$ in General formula (2) above).

<7> The polycarbonate resin composition according to any one of <1> to <6> above, wherein the viscosity-average molecular weight of the polycarbonate resin (A) is 10,000-60,000.

<8> The polycarbonate resin composition according to any one of <1> to <7> above, comprising 10 parts by mass or less of the silane coupling agent (B) per 100 parts by mass of the polycarbonate resin (A).

<9> A film or coating comprising the polycarbonate resin composition according to any one of <1> to <8> above.

<10> A paint composition comprising the polycarbonate resin composition according to any one of <1> to <8> above.

<11> The paint composition according to <10> above, further comprising a solvent component.

<12> A resin solution comprising the resin composition according to any one of <1> to <8> above and a non-halogenated organic solvent.

<13> A coating solution comprising the resin composition according to any one of <1> to <8> above.

<14> A printing ink comprising the resin composition according to any one of <1> to <8> above.

<15> A conductive paste comprising the resin composition according to any one of <1> to <8> above.

<16> An adhesive curable resin composition, which comprises the polycarbonate resin composition according to any one of <1> to <8> above and which does not comprise a solvent.

Advantageous Effect of the Invention

A resin coating resulting from a resin solution containing a resin composition of the present invention is advantageous in that it has stronger adhesiveness to the base material and is less likely to peel off than a conventional polycarbonate resin coating. In addition, with the resin composition of the present invention, adhesiveness to a wide range of base materials can be improved.

EMBODIMENTS FOR CARRYING OUT THE INVENTION

The present invention relates to a polycarbonate resin composition containing specific polycarbonate resin and silane coupling agent, and to a film or coating, a resin solution, a coating solution, a printing ink, a conductive paste, a paint composition, and an adhesive curable resin composition, each containing the polycarbonate resin composition. Hereinafter, each of these objects of the present invention will be described.

1. Polycarbonate Resin Composition

A polycarbonate resin composition of the present invention comprises a polycarbonate resin (A) and a silane coupling agent (B) as described above. The polycarbonate resin composition preferably contains the polycarbonate resin (A) and the silane coupling agent (B) as a mixture.

The polycarbonate resin composition of the present invention contains 0.06 parts by mass or more of the silane coupling agent (B) per 100 parts by mass of the polycarbonate resin (A). Specifically, the polycarbonate resin composition of the present invention contains 0.06% by mass or more (600 ppm by mass or more) of the silane coupling agent (B) based on the total mass of the polycarbonate resin (A) and silane coupling agent (B).

In one embodiment of the present invention, the polycarbonate resin composition contains 0.07 parts by mass or more, more preferably 0.08 parts by mass or more, particularly preferably 0.09 parts by mass or more, or 0.1 parts by mass or more of the silane coupling agent (B) per 100 parts by mass of the polycarbonate resin (A). Thus, the amount of the silane coupling agent (B) based on the total mass of the polycarbonate resin (A) and silane coupling agent (B) in the polycarbonate resin composition is preferably 0.07% by mass or more, more preferably 0.08% by mass or more, particularly preferably 0.09% by mass or more, or 0.1% by mass or more.

Even if the silane coupling agent (B) is used in excess with respect to the polycarbonate resin (A), it is very likely that the effect of adhesiveness will be achieved. Therefore, although the upper limit of the content of the silane coupling agent (B) in the resin composition is not so important, in one embodiment of the present invention, the polycarbonate resin composition preferably contains 10 parts by mass or less, more preferably 8 parts by mass or less, still more preferably 6 parts by mass or less, particularly preferably 5 parts by mass or less, and, for example, 2 parts by mass or less of the silane coupling agent (B) per 100 parts by mass or less of the polycarbonate resin (A). Thus, the amount of the silane coupling agent (B) based on the total mass of the polycarbonate resin (A) and silane coupling agent (B) in the polycarbonate resin composition is about 10 parts by mass or less, more preferably about 8 parts by mass or less, still more preferably about 6 parts by mass or less, particularly preferably about 5 parts by mass or less, and, for example, about 2 parts by mass or less.

2. Polycarbonate Resin (A)

The polycarbonate resin (A) contained in the polycarbonate resin composition has a structural unit represented by Formula (1) (hereinafter also referred to as Structural unit (1)) as described above.

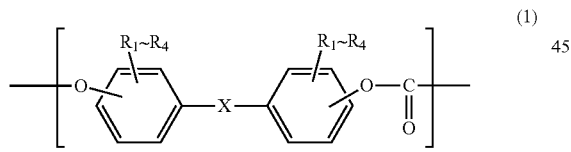

(in Formula (1), $R_1$-$R_4$ each independently represent hydrogen, fluorine, chlorine, bromine, iodine, or an optionally substituted C1-C20 alkyl group, C6-C12 aryl group, C2-C12 alkenyl group, C1-C5 alkoxy group, or C7-C17 aralkyl group. $R_1$-$R_4$ may each independently represent a C1-C12, C1-C8 or C1-C4 alkyl group, a C6-C12, C6-C10, C6 or C7 aryl group, a C2-C12, C2-C8, C2-C6 or C2-C4 alkenyl group, a C1-C5, C1-C3, C1 or C2 alkoxy group, or a C7-C17, C7-C12, C7-C10, C7 or C8 aralkyl group.

Note that $R_1$-$R_4$ represent each of the four groups bonded to the benzene ring in Formula (1), and they may be identical or different from each other.

$R_1$-$R_4$ are preferably hydrogen or a C1-C10 alkyl group, more preferably hydrogen or a C1-C5 alkyl group, particularly preferably hydrogen or an alkyl group such as a methyl group or an ethyl group.

X in Formula (1) represents a single bond, —O—, —S—, —SO—, —SO$_2$—, —CO—, or a divalent group represented by any of General formulae (4)-(9) below.

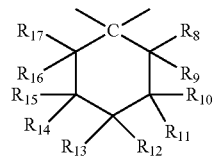

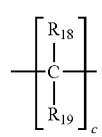

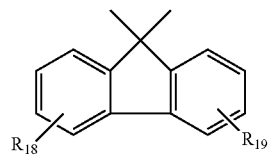

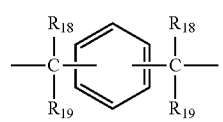

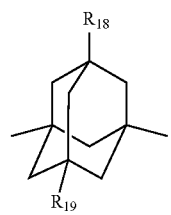

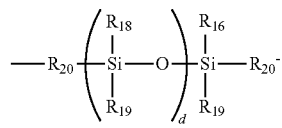

In General formula (4), $R_8$-$R_{17}$ each independently represent hydrogen or a C1-C3 alkyl group, where at least one of $R_8$-$R_{17}$ represents a C1-C3 alkyl group.

In General formulae (5) to (9), $R_{18}$ and $R_{19}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group, or an optionally substituted C2-C15 alkenyl group, or $R_{18}$ and $R_{19}$ bind with each other to form a C3-C20 carbon ring or a C1-C20 heterocyclic ring.

$R_{20}$ represents an optionally substituted C1-C9 alkylene group. The two $R_{20}$ in Formula (9) are each independently selected from optionally substituted C1-C9 alkylene groups, where the two $R_{20}$ may be the same alkylene group or different alkylene groups from each other.

In addition, c in General formula (5) represents an integer from 0 to 20, and d in General formula (9) represents an integer from 1 to 500.

In one embodiment of the present invention, when X in Structural unit (1) is a divalent group represented by General formula (4) above, $R_8$-$R_{17}$ each independently represent hydrogen or a C1-C3 alkyl group, preferably hydrogen or a methyl group, where at least one of $R_8$-$R_{17}$ is a C1-C3 alkyl group.

In one embodiment of the invention, $R_8$-$R_{17}$ may each independently be hydrogen, methyl, ethyl, n-propyl, or isopropyl, where at least one of $R_8$-$R_{17}$ is methyl, ethyl, n-propyl, or isopropyl.

In one embodiment of the present invention, when X in Structural unit (1) is a divalent group represented by any of General formulae (5) to (9) above, $R_{18}$ and $R_{19}$ may each independently be hydrogen, a halogen, an optionally substituted C1-C20 alkyl group, an optionally substituted C1-C5 alkoxy group, an optionally substituted C6-C12 aryl group, an optionally substituted C7-C17 aralkyl group, or an optionally substituted C2-C15 alkenyl group, and may preferably represent hydrogen, a halogen, an optionally substituted C1-C10 alkyl group, an optionally substituted C1-C3 alkoxy group, an optionally substituted C6-C8 aryl group, an optionally substituted C7-C12 aralkyl group, or an optionally substituted C2-C5 alkenyl group.

In another embodiment of the present invention, $R_{18}$ and $R_{19}$ may bind with each other to form a C3-C20 carbon ring or a C1-C20 heterocyclic ring, preferably a C3-C12 carbon ring or a C1-C12 heterocyclic ring.

In a preferred embodiment of the present invention, $R_{18}$ and $R_{19}$ may bind with each other to form a C3-C12 carbon ring.

In one embodiment of the present invention, when X in Structural unit (1) is a divalent group represented by General formula (9) above, $R_{20}$ is an optionally substituted C1-C9 alkylene group, preferably an optionally substituted C1-C5 alkylene group.

In one embodiment of the present invention, when X in Structural unit (1) is a divalent group represented by General formula (5) or (9) above, c preferably represents an integer from 0 to 12 and d may represent an integer from 1 to 300, c more preferably represent an integer from 1 to 6, and c is particularly preferably 1. In addition, d may represent an integer from 1 to 100.

In one embodiment of the present invention, X in Structural unit (1) may be a single bond, —O—, —S—, or a divalent group represented by either of General formulae (4) and (5) above, preferably a divalent group represented by General formula (5) above.

Moreover, examples of the above substituent contained in Structural unit (1) include a halogen, a cyano group, and an alkenyl group with, for example, 5 or less carbon atoms. The number of carbon atoms mentioned above is the total number of carbon atoms including the number of carbon atoms of the substituent.

In one embodiment of the present invention, Structural unit (1) may be derived from a bisphenol compound. Examples of the bisphenol compound that forms Structural unit (1) include, but are not limited to, bisphenol C (2,2-bis (3-methyl-4-hydroxyphenyl)propane; BPC), 1,1-bis(4-hydroxy-3-methylphenyl)-1-phenylethane), 1,1-bis(4-hydroxy-3-methylphenyl)cyclohexane, 1,1-bis(4-hydroxy-3-methylphenyl)ethane, bis(4-hydroxy-3-methylphenyl) methane, 4,4'-biphenyldiol, bis(4-hydroxyphenyl)methane (bisphenol F; BPF), bis(2-hydroxyphenyl)methane, 2,4'-dihydroxydiphenylmethane, bis(4-hydroxyphenyl)ether, bis (4-hydroxyphenyl)sulfone, 2,4'-dihydroxydiphenylsulfone, bis(2-hydroxyphenyl)sulfone, bis(4-hydroxy-3-methylphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane (bisphenol E; BPE), 1,1-bis(4-hydroxyphenyl)-1-phenylethane (bisphenol AP; BPAP), bis (4-hydroxyphenyl)diphenylmethane (bisphenol BP; BPBP), 1,1-bis(4-hydroxyphenyl)cyclododecane (bisphenol CD; BPCD), 2,2-bis(4-hydroxyphenyl)propane (bisphenol A; BPA), 2,2-bis(4-hydroxy-3-methylphenyl)propane, 1,1-bis (4-hydroxy-3-methylphenyl)ethane, bis(4-hydroxy-3-methylphenyl)methane, 2,2-bis(4-hydroxy-3-t-butylphenyl)propane, 2,2-bis(4-hydroxyphenyl)butane (bisphenol B; BPB), 1,1-bis(4-hydroxyphenyl)cyclohexane (bisphenol Z; BPZ), 1,1-bis(4-hydroxy-3-methylphenyl)cyclohexane, 1,1-bis(4-hydroxyphenyl)cycloundecane, 2,2-bis(4-hydroxy-3-allylphenyl)propane, 3,3,5-trimethyl-1,1-bis(4-hydroxyphenyl) cyclohexane, 9,9-bis(4-hydroxy-3-ethylphenyl)fluorene, 9,9-bis(4-hydroxy-3-methylphenyl)fluorene, 9,9-bis(4-hydroxyphenyl)fluorene, α,ω-bis[3-(o-hydroxyphenyl)propyl] poly(dimethyl diphenyl) random copolymer siloxane, α,ω-bis[3-(o-hydroxyphenyl)propyl]polydimethylsiloxane, 4,4'-[1,4-phenylenebis(1-methylethylidene)]bisphenol, 4,4'-[1,3-phenylenebis(1-methylethylidene)]bisphenol, 2,2-bis(4-hydroxy-3-isopropylphenyl)propane (bisphenol G), 1,1-bis (4-hydroxyphenyl)-2-ethylhexane (bisphenol phenol IOTD), 1,1-bis(4-hydroxyphenyl)-2-methylpropane (bisphenol IBTD), 2,2-bis(4-hydroxyphenyl)-4-methylpentane (bisphenol MIBK; MIBK), 5,5'-(1-methylethylidene)-bis[1, 1'-(bisphenyl)-2-ol]propane (bisphenol PH), 1,1-bis(4-hydroxyphenyl)-3,3,5-trimethylcyclohexane (bisphenol TMC), 2,2-bis(4-hydroxyphenyl)-4-methylpentane, 1,1-bis (4-hydroxyphenyl)decane, and 1,3-bis(4-hydroxyphenyl)-5, 7-dimethyladamantane. One of them can be used alone or two or more of them can be used in combination.

Moreover, specific examples of these bisphenol compounds include 1,1-bis(4-hydroxyphenyl)cyclohexane (BPZ), 1,1-bis(4-hydroxyphenyl)-1-phenylethane (bisphenol AP; BPAP), 1,1-bis(4-hydroxyphenyl)cyclododecane (bisphenol CD; BPCD), 2,2-bis(4-hydroxy-3-methylphenyl-)propane (bisphenol C; BPC), 2,2-bis(4-hydroxyphenyl) propane (bisphenol A; BPA), 2,2-bis(4-hydroxyphenyl)-4-methylpentane (bisphenol MIBK; MIBK), and 2-bis(4-hydroxyphenyl)hexafluoropropane (BPAF). Note that if 2,2-bis(4-hydroxyphenyl)propane (bisphenol A; BPA) is used alone, solubility in a non-halogenated organic solvent will be reduced. For this reason, according to the present invention, it is preferable not to use 2,2-bis(4-hydroxyphenyl) propane alone, and it is preferable to employ a polycarbonate resin that has a BPA-derived structural unit and a structural unit derived from a bisphenol compound other than BPA.

In one embodiment of the present invention, the polycarbonate resin (A) may contain a structural unit other than Structural unit (1). The structural unit other than Structural unit (1) can also be derived from a bisphenol compound.

In one embodiment of the present invention, Structural unit (1) is preferably one or more structural units selected from the group consisting of structural units represented by Formulae (10) to (22) below.

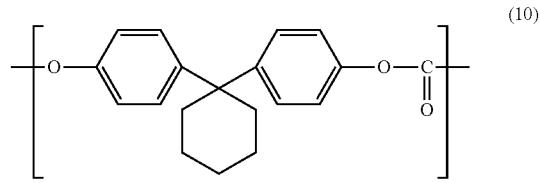

(10)

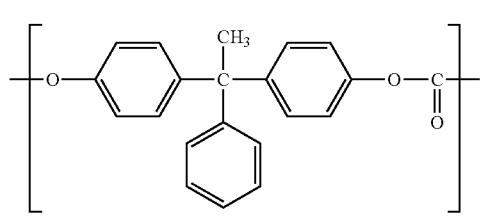
(11)

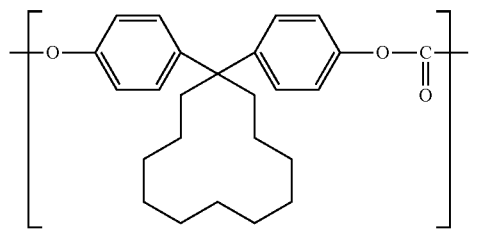
(12)

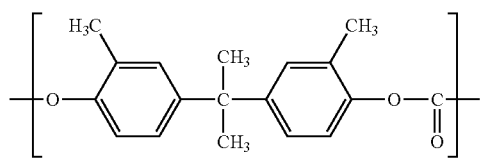
(13)

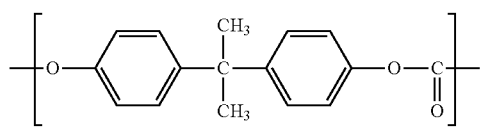
(14)

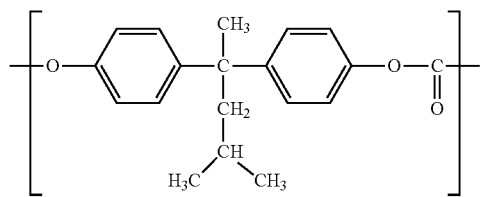
(15)

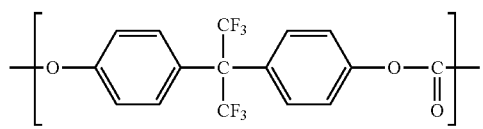
(16)

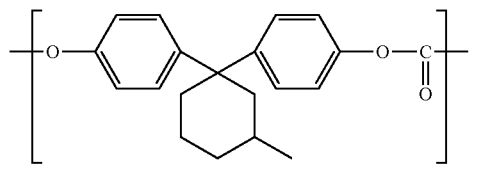
(17)

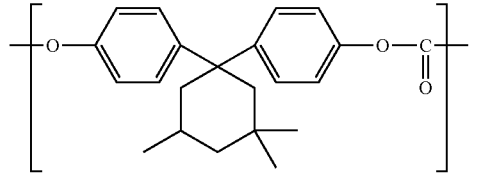
(18)

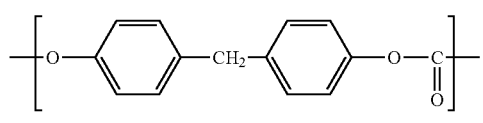
(19)

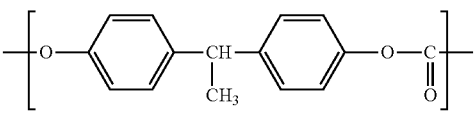
(20)

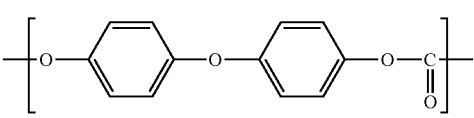
(21)

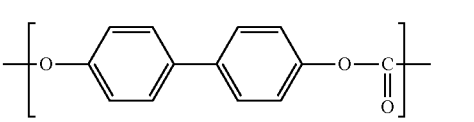
(22)

In one embodiment of the present invention, Structural unit (1) is preferably contained at 40 mol % or more based on the number of moles of all structural units contained in the polycarbonate resin (A).

More preferably, Structural unit (1) is contained in the polycarbonate resin (A) at 50 mol % or more, still more preferably at 55 mol % or more, and particularly preferably at 60 mol % or more based on all of the structural units.

The polycarbonate resin (A) may consist of Structural unit (1). Therefore, the upper limit of the percentage of Structural unit (1) in the polycarbonate resin (A) is not particularly important, but the percentage of Structural unit (1) in the polycarbonate resin (A) is, for example, 98 mol % or less, 97 mol % or less, or 95 mol % or less based on all of the structural units.

(ii) Terminal Structure

The polycarbonate resin (A) contained in a polycarbonate resin composition preferably has a terminal structure represented by General formula (3) (hereinafter, also referred to as Terminal structure (3)) as described above.

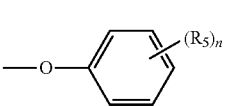
(3)

In General formula (3), $R_5$ each independently represent a $C_1$-$C_8$ alkyl group, which may be substituted by a hydroxyl group. In one embodiment of the present invention, $R_5$ in General formula (3) is preferably a C1-C6 alkyl group, and more preferably a C1-C4 alkyl group, which may be substituted by a hydroxyl group.

Note that the terminal structure is attached to the carbonyl carbon (carbon atom of the carbonyl group of C=O) of the structural unit at the end of the polymer chain of the polycarbonate resin (A) via the bond line on the left of the O atom in General formula (3)

Specific examples of the terminal structure represented by General formula (3) include a terminal structure of an aromatic ring (benzene ring) having a C2-C4 alkyl group, which may contain one hydroxyl group, for example, those represented by Formulae (3-1) and (3-2) below. In Formulae (3-1) and (3-2), the sign * represents the moiety attached to the carbonyl group of C=O at the end of the main chain of the polycarbonate resin (A).

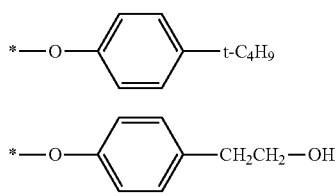

(3-1)

(3-2)

In General formula (3), n is an integer from 0 to 5, preferably an integer from 0 to 4, more preferably an integer from 1 to 3, still more preferably 1 or 2, and particularly preferably 1.

Moreover, $R_5$, which is a C1-C8 alkyl group contained in Terminal structure (3), may have, in addition to the hydroxyl group mentioned above, a halogen, a cyano group, an alkenyl group with, for example, 5 or less carbon atoms as a substituent. The number of carbon atoms of $R_5$ mentioned above is the total number of carbon atoms including carbon atoms of the substituent.

While multiple terminal structures represented by Formula (3) are contained in the same polycarbonate molecule, the values of $R_5$ and n are determined independently for each terminal structure.

In one embodiment of the invention, Terminal structure (3) may be contained in the molecule of the polycarbonate resin at a percentage of 0.5 mol % or more and 12 mol % or less, preferably 1.0 mol % or more and 10 mol % or less, and more preferably 1.5 mol % or more and 8 mol % or less, based on the total moles of Structural unit (1) and Terminal structure (3).

In one embodiment of the present invention, Terminal structure (3) is derived in the polycarbonate resin from, for example, a monovalent phenol. Examples of the monovalent phenol that derives Structure (3) at the molecular end of polycarbonate include, but are not limited to, phenol, a tert-butylphenol such as p-tert-butylphenol (PTBP), a cumylphenol such as p-cumylphenol, octylphenol, a long-chain alkyl-substituted phenol, p-hydroxyphenethyl alcohol (=tyrosol), m-hydroxyphenethyl alcohol, o-hydroxyphenethyl alcohol, o-hydroxybenzyl alcohol (=salicyl alcohol), p-hydroxybenzyl alcohol, m-hydroxybenzyl alcohol, vanillyl alcohol, homovanillyl alcohol, 3-(4-hydroxy-3-methoxyphenyl)-1-propanol, sinapyl alcohol, coniferyl alcohol, and a coumaryl alcohol such as p-coumaryl alcohol.

Among these specific examples, p-tert-butylphenol (PTBP), p-hydroxyphenethyl alcohol (PHEP), and p-hydroxybenzyl alcohol are preferred in terms of reactivity, and p-tert-butylphenol (PTBP) and hydroxyphenethyl alcohol (PHEP) are more preferred.

In one embodiment of the invention, the terminal structure represented by Structural formula (3) can be derived from either p-tert-butylphenol (PTBP) or p-hydroxyphenethyl alcohol (PHEP). PTBP forms the terminal structure represented by Formula (3-1) above, and PHEP forms the terminal structure represented by Formula (3-2) above.

In one embodiment of the present invention, the percentage of Terminal structure (3) relative to the number of moles of all structural units contained in the polycarbonate resin (A) is preferably 12 mol % or less, more preferably 10 mol % or less, and particularly preferably 8.0 mol % or less. Moreover, the percentage of the number of moles of Terminal structure (3) relative to the number of moles of all structural units contained in the polycarbonate resin (A) is, for example, 0.1 mol % or more, preferably 0.3 mol % or more, and more preferably 0.5 mol % or more.

(iii) Production of Polycarbonate Resin (A)

The polycarbonate resin (A) used in the present invention can be produced by a conventional method. For example, it can be produced as follows.

A polycarbonate resin used in a coating resin solution of the present invention can be produced via the reaction of a monovalent phenol that derives Terminal structure (3), a bisphenol that derives Structural unit (1), and a carbonate ester-forming compound. A known method that is used to produce a polycarbonate derived from bisphenol A, for example, a method such as direct reaction between a bisphenol and phosgene (phosgene method) or transesterification reaction between a bisphenol and a bisaryl carbonate (transesterification method), or the like can be employed.

According to the phosgene method, generally, a bisphenol, a monovalent phenol that derives Terminal structure (3), and phosgene are allowed to react in the presence of an acid-binding agent and a solvent. For example, pyridine, an alkali metal hydroxide such as sodium hydroxide or potassium hydroxide, or the like may be used as the acid-binding agent, while methylene chloride, chloroform, or the like may be used as the solvent. In addition, in order to accelerate the condensation polymerization reaction, it is preferable to use a catalyst, for example, a tertiary amine such as triethylamine or a quaternary ammonium salt such as benzyltriethylammonium chloride.

While the monovalent phenol that derives Terminal structure (3) functions as a polymerization modifier, it can also be used in combination with other monovalent phenol such as phenol, p-t-butylphenol, p-cumylphenol, or a long-chain alkyl-substituted phenol at a percentage of less than 50 mass % relative to the monovalent phenol that derives Terminal structure (3). Furthermore, an antioxidant such as sodium sulfite or hydrosulfite, and a branching agent such as phloroglucin or isatin bisphenol may also be added in small amounts if desired. The reaction temperature is usually in the range of 0-150° C., preferably 5-40° C. While the reaction time depends on the reaction temperature, it is usually 0.5 minutes to 10 hours, preferably 1 minute to 2 hours. The pH of the reaction system is desirably kept at 10 or higher during the reaction.

Alternatively, according to the transesterification method, a bisphenol, a monovalent phenol that derives Terminal structure (3), and a bisaryl carbonate are mixed, and the mixture is reacted at high temperature under reduced pressure. Examples of the bisaryl carbonate include bisallyl carbonates such as diphenyl carbonate, di-p-tolyl carbonate, phenyl-p-tolyl carbonate, di-p-chlorophenyl carbonate, and dinaphthyl carbonate. Two or more kinds of these compounds may be used in combination. The reaction is usually carried out at a temperature in the range of 150-350° C., preferably 200-300° C., and the final degree of pressure reduction is preferably 1 mmHg or lower to distill phenols derived from the bisaryl carbonate generated by the transesterification reaction away from the system. While the reaction time depends on the reaction temperature and the degree of pressure reduction, it is usually about 1-24 hours. The reaction is preferably carried out under an inert gas atmosphere such as nitrogen or argon, and if desired, a small amount of a molecular weight regulator other than the monovalent phenol that derives Terminal structure (3) may be used in combination, and an antioxidant and a branching agent may be added to carry out the reaction.

The polycarbonate resin used in the present invention preferably maintains solvent solubility, coating properties, adhesiveness, scratch resistance, impact resistance, and the like that are required as a coating-forming resin used in a coating resin solution in good balance. If the intrinsic viscosity of the resin is too low, scratch resistance and impact strength will be insufficient whereas if the intrinsic viscosity is too high, solvent solubility will decrease and solution viscosity will increase, resulting in reduced coating properties. As a desirable intrinsic viscosity range, the intrinsic viscosity is preferably in the range of 0.3-2.0 dl/g, and more preferably in the range of 0.35-1.5 dl/g.

3. Silane Coupling Agent (B)

According to the present invention, the polycarbonate resin composition contains a silane coupling agent (B) as described above.

The silane coupling agent (B) is represented by General formula (2).

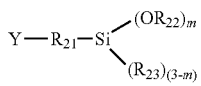
(2)

In General formula (2), $R_{21}$ is a linear or branched C1-C4 alkylene group or a phenylene group such as a C6-C12 phenylene group, and $R_{21}$ is preferably a linear or branched C1-C4 alkylene group, more preferably a linear C1-C3 alkylene group, and still more preferably a C1 or C2 alkylene group. The alkylene group represented by $R_{21}$ may contain an ether bond.

In General formula (2), $R_{22}$ are each independently a C1-C4 alkyl group, preferably a C1-C3 alkyl group, and more preferably a C1 or C2 alkyl group (specifically, a methyl group or ethyl group).

In General formula (2), $R_{23}$ are each independently a hydroxyl group or a C1-C4 alkyl group, preferably a C1-C3 alkyl group, and more preferably a C1 or C2 alkyl group (specifically, a methyl group or ethyl group).

In General formula (2), m is an integer from 1 to 3.

Specific examples of the active group Y in the silane coupling agent (B) represented by General formula (2) include an epoxy group, an isocyanate group, a vinyl group, a styryl group, an acryloyl group, an ureido group, an isocyanurate group, or a mercapto group, where the active group Y is represented by, for example, Formulae (i) to (ix) below.

In Formulae (i) to (ix), the sign * represents the bond point with $R_{21}$ in General formula (2).

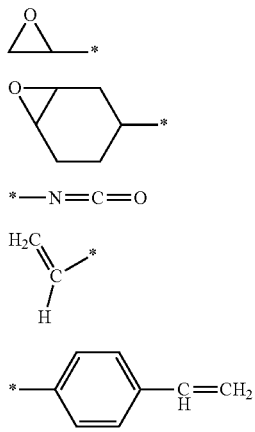

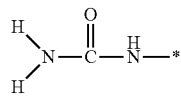
(vi)

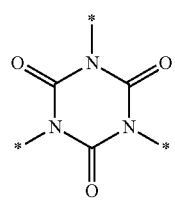
(vii)

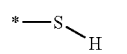
(viii)

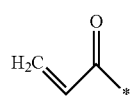
(ix)

In Formulae (i) to (ix), the hydrogen atom represented by H in $CH_2$, NH, and N—H may each independently be substituted by $R_{18}$ above, which represents a C1-C6 alkyl group, a C6-C10 aryl group, a C2-C8 alkenyl group, a C1-C4 alkoxy group, or a C7-C12 aralkyl group. For example, one H (hydrogen atom) of $CH_2$ in General formula (iv) or (v) may be substituted by $R_{18}$.

While the epoxy group as the active group Y is represented, for example, by Formula (i) or (ii) above, it may further have a C1-C5 (e.g., C1-C3) alkyl group. It may also have a C4-C8 alicyclic structure.

While the isocyanate group as the active group Y is represented, for example, by Formula (iii) above, it may further have a C1-C5 (e.g., C1-C3) alkylene group attached to N.

While the vinyl group as the active group Y is represented, for example, by Formula (iv) above, it may further have a C1-C5 (e.g., C1-C3) alkyl group. It may also have a C6-C10 aromatic ring.

While the styryl group as the active group Y is represented, for example, by Formula (v) above, it may further have a C1-C5 (e.g., C1-C3) alkyl group. Specific examples of a silane coupling agent (B) containing a styryl group as the active group Y include one represented by Formula (2-5) below.

While the ureido group as the active group Y is represented, for example, by Formula (vi) above, it may further have a C1-C5 (e.g., C1-C3) alkyl group. While the isocyanurate group as the active group Y is represented, for example, by Formula (vii) above, one or two of the three bond points (sign *) with $R_{21}$ in General formula (2) may each independently be substituted by a hydrogen atom, or a C1-C5 (e.g., C1-C3) alkyl group.

While the mercapto group as the active group Y is represented, for example, by Formula (viii) above, multiple mercapto groups may be contained in the same molecule of the silane coupling agent (B).

While the acryloyl group as the active group Y is represented, for example, by Formula (ix) above and may further have a C1-C5 (e.g., C1-C3) alkyl group, a methacryloyl group is preferably excluded. Specific examples of a silane coupling agent (B) containing an acryloyl group as the active group Y include one represented by Formula (2-6) below.

Specific examples of the silane coupling agent (B) include those represented by Formulae (2-1) to (2-6) below.

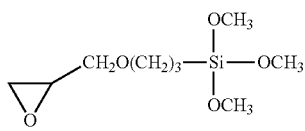
(2-1)

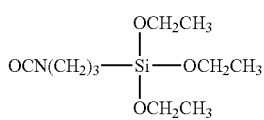
(2-2)

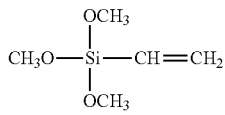
(2-3)

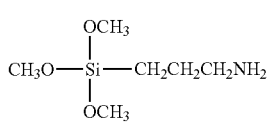
(2-4)

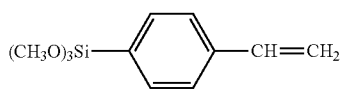
(2-5)

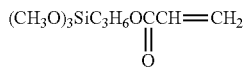
(2-6)

The active group represented by Y in Formula (2) reacts with the terminal hydroxyl group or the like of the polycarbonate resin (A) or the active moiety of the organic compound in the base material to form a bond, or interacts without formation of a bond such as hydrogen bond.

A polycarbonate resin composition containing a silane coupling agent with such an active group can enhance adhesiveness of a resin layer to a wide variety of base materials, which will be described in detail below. For example, a resin layer that is highly adhesive not only to a metal base material such as stainless steel but also to a glass base material can be realized.

In the polycarbonate resin composition, a single type of silane coupling agent (B) or two or more types of silane coupling agents (B) may be used.

4. Other Components in Polycarbonate Resin Composition

The polycarbonate resin composition may also contain a component other than the polycarbonate resin (A) and the silane coupling agent (B). Examples of such a component include thermoplastic resins other than the polycarbonate resin (A), additives such as an antioxidant and a UV absorber, inorganic fillers, and conductive fillers.

However, since the polycarbonate resin composition does not require curability, e.g., photocurability or thermocurability, it does not require the addition of a photoinitiator, a polymerization precursor that polymerizes under given conditions, or the like.

In the polycarbonate resin composition, the content of components other than the polycarbonate resin (A) and the silane coupling agent (B) is preferably 10% by mass or less, more preferably 8% by mass or less, still more preferably 6% by mass or less, and particularly preferably 4% by mass or less, and, for example, 2% by mass or less based on the total mass of the polycarbonate resin composition.

From the viewpoint of simplifying the structural components, the content of thermoplastic resins other than the polycarbonate resin (A) in the polycarbonate resin composition is preferably 20% by mass or less, more preferably 15% by mass or less, still more preferably 10% by mass or less, yet still more preferably 8% by mass or less, and particularly preferably 5% by mass or less based on the total weight of the polycarbonate resin composition. Furthermore, the polycarbonate resin composition preferably contains no thermoplastic resin other than the polycarbonate resin (A).

5. Film or Coating

A film or coating of the present invention contains the polycarbonate resin composition described above. In one embodiment, a film or coating containing the above-mentioned polycarbonate resin composition or a cross-linked composition in which the above-mentioned polycarbonate resin composition is at least partially cross-linked is provided.

In one embodiment of the present invention, the above film or coating can be obtained by applying the coating resin solution or printing ink of the present invention to a base material and then heating or drying it. In one embodiment of the present invention, the above film or coating may be a single layer or a multi-layer laminate.

A film can also be obtained by performing coating with the printing ink of the present invention which will be described in detail below. For example, after decorative printing is performed on a base material film which is not yet coated with the printing ink, the solvent is removed by drying, and a dye/pigment is fixed to the binder resin while the film and the binder resin are adhered to each other, thereby obtaining a decoratively printed film, i.e., a base material film coated with the above printing ink. A conventional method can be used to coat a base material with the printing ink, where the examples of such a method include, but are not limited to, screen printing, gravure printing, and flexographic printing.

6. Paint Composition

A paint composition of the present invention contains the polycarbonate resin composition described above. In one embodiment, the paint composition contains, in addition to the polycarbonate resin composition of the invention, the following. Specifically, the paint composition may contain: other resin component including an epoxy resin, a polyester resin, an acrylic resin, a urethane resin, a fluorine resin, and a silicone resin; a pigment component including an inorganic pigment such as titanium oxide, carbon black, calcium carbonate, or metal particles, or an organic pigment such as an azo pigment or a phthalocyanine pigment; and a solvent component including an alcohol, a ketone, an aliphatic hydrocarbon, an aromatic hydrocarbon, an ester, and an ether.

The paint composition preferably contains the polycarbonate resin composition at 1-50% by mass, more preferably at 5-40% by mass, and still more preferably at 10-30% by mass based on the total mass of the paint composition.

In the paint composition, the content of other resin component is preferably 70% by mass or less, more preferably 60% by mass or less, and still more preferably 50% by mass or less.

Moreover, the paint composition preferably contains the pigment component at 50% by mass or less, more preferably at 40% by mass or less, and still more preferably at 30% by mass or less.

Moreover, the paint composition preferably contains the solvent component at 10-80% by mass, more preferably at 20-70% by mass, and still more preferably at 30-60% by mass.

It is possible to use a resin other than the polycarbonate resin as the main component and the polycarbonate resin as the additive, or to use the polycarbonate resin as the main component and other resin as the additive, although the latter is preferred.

7. Resin Solution Containing Polycarbonate Resin Composition (Coating Solution)

A resin solution, for example, a coating solution, of the present invention is a solution of the above-mentioned polycarbonate resin composition dissolved in an organic solvent, for example, a solvent containing a non-halogenated solvent, in which case, it generally results in a coating called a clear color. In addition, a desired dye or pigment can be dissolved or dispersed to create a colored coating.

As mentioned above, the solvent for the resin solution or the coating solution of the present invention is an organic solvent, which is preferably a solvent containing a non-halogenated solvent, more preferably a solvent containing a non-halogenated organic solvent as the main solvent.

The non-halogenated organic solvent that can be used as the solvent for the resin solution or the coating solution of the present invention may include one or more solvents selected from the group consisting of ester-based solvents, ether-based solvents, carbonate ester-based solvents, and ketone-based solvents.

The solvent for the resin solution or the coating solution of the present invention is mainly a solvent generally used for paints or the like. Specifically, examples of such a solvent include ester-based solvents such as methyl acetate, ethyl acetate, propyl acetate, butyl acetate, 2-ethoxy ethyl acetate, 2-methoxy-1-methyl ethyl acetate, and ethyl lactate, ketone-based solvents such as acetone, methyl ethyl ketone, methyl isobutyl ketone, cyclohexanone, and isophorone, carbonate ester-based solvents such as dimethyl carbonate and ethyl methyl carbonate, ether-based solvents such as tetrahydrofuran, 1,4-dioxane, diethyl ether, dimethoxymethane, ethyl cellosolve, and anisole, and aromatic hydrocarbon-based solvents such as toluene, ethylbenzene, xylene, pseudocumene, and mesitylene. In addition, a small amount of an alcoholic poor solvent such as ethanol or isopropyl alcohol, or a hydrocarbon-based poor solvent such as n-heptane, cyclohexane, or mineral spirit may be used in combination.

Among them, ester-based solvents such as propyl acetate and butyl acetate, ketone-based solvents such as methyl ethyl ketone and cyclohexanone, and ether-based solvents such as tetrahydrofuran and dimethoxymethane, which are inexpensive, easy to work with, and relatively safe, are preferred, and methyl ethyl ketone and propyl acetate are particularly preferred.

Furthermore, since a halogenated solvent such as dichloromethane has a large impact on the coating work environment, it is preferable not to use it as the main solvent for the coating resin solution of the present invention.

In one embodiment of the invention, the resin solution contains the above-described polycarbonate resin composition and non-halogenated organic solvent. In one embodiment of the present invention, the above-mentioned polycarbonate resin composition may be a cross-linked composition in which the polycarbonate resin composition is at least partially cross-linked.

While the viscosity of the coating resin solution of the present invention can be set freely according to the desired coating method, it is preferably in the range of 10-20,000 mPa/s. The viscosity is preferably 400-20,000 mPa/s for airless spraying, brush application, and roller application, preferably 100-6,000 mPa/s for air spray, and preferably 10-500 mPa/s for dip application and can spraying.

A pigment, a dye, colored particles, or light-interfering particles can be added to the resin solution, for example, a coating resin solution, of the present invention to enhance the color effect. Among the pigments and dyes, examples of organic pigments include azo pigments and phthalocyanine pigments, specifically, for example, Red No. 104, Red No. 106, Red No. 201, Red No. 202, Red No. 204, Red No. 215, Red No. 220, Orange No. 203, Orange No. 204, Blue No. 1, Blue No. 404, Yellow No. 205 Yellow No. 401, and Yellow No. 405. It is also possible to use mica titanium, titanium oxide, iron oxide, tin oxide, zirconium oxide, chromium oxide, bismuth oxychloride, silica, chromium, titanium nitride, titanium, magnesium fluoride, gold, silver, nickel, or the like to produce white color, pearl color, metallic color, or lame appearance. Particles with light interference properties are particles that enhance color effects by reflecting and scattering light, and examples thereof include glass beads, microscopic shells, and mica. These are preferably added to the coating resin solution in an amount as desired preferably in the range of 0.0001-10.0% by mass, more preferably in the range of 0.01-5.0% by mass, and still more preferably in the range of 0.1-3.0% by mass based on the total mass of the solution.

If necessary, an anti-rust agent, an antioxidant, a dispersant, a UV absorber, a defoaming agent, a leveling agent, and the like may further be added.

While the amount of the polycarbonate resin blended in the coating resin solution of the present invention depends on the intrinsic viscosity and the solvent solubility, it is preferably 1-50% by mass and more preferably 4-30% by mass based on the total mass of the solution. If the concentration is within such a range, solvent solubility and coating property will be well balanced, and workability and appearance will be improved.

The coating obtained by coating the coating resin solution of the present invention is less likely to be scratched or peeled off by abrasion, impact, or the like during transportation or use than a coating of a conventional polycarbonate coating resin solution.

The thickness of the coating obtained by coating the coating resin solution of the present invention is preferably in the range of 5-200 μm, particularly preferably 10-120 μm, and even more preferably in the range of 15-60 μm. A thin coating thinner than 5 μm is not strong enough and a scratch can easily reach the base material whereas a thick film thicker than 200 μm is likely to result peeling due to shrinkage of the coating, which is also economically disadvantageous considering the use of the coating that is eventually peeled off and discarded.

8. Printing Ink Containing Resin Solution

The above-described resin solution can be used as a binder resin solution to obtain a printing ink. Such a printing ink of the present invention can be used, for example, for decorative printing. In general, printing inks for decorative printing are mainly composed of a solvent, a dye/pigment, and a binder resin. Examples of a dye or pigment used in the above printing ink include, but are not limited to, dyes such as an anthraquinone-based dye and a naphthoquinone-based dye, inorganic pigments such as titanium oxide, carbon black, calcium carbonate, and metal particles, and organic pigments such as an azo pigment and a phthalocyanine pigment. This dye/pigment exists in the ink in a dissolved or dispersed state together with the binder resin. A printing ink using the resin solution of the present invention as the binder resin solution has excellent adhesiveness.

In addition to the binder resin and the dye/pigment, fine organic and inorganic particles, a mold release agent, an antioxidant, a plasticizer, a dispersant, an infrared absorber, an antistatic agent, a UV absorber, a defoaming agent, a leveling agent, and the like may be added to the above printing ink as needed.

While the amount of the binder resin blended in the ink depends on the intrinsic viscosity and solvent solubility, it is preferably 1-70% by mass and more preferably 5-50% by mass based on the total mass of the binder resin. If the concentration of the binder resin is within such a range, solvent solubility and ink application property will be well balanced, and workability will be improved.

The amount of the polycarbonate resin blended in the printing ink of the present invention is, for example, 1-50% by mass and preferably 4-30% by mass relative to the total mass of the printing ink.

9. Conductive Paste

A conductive paste of the present invention contains the polycarbonate resin composition. In one embodiment, the conductive paste contains, in addition to the polycarbonate resin composition of the present invention, a conductive substance such as silver, nickel, copper, graphite, and carbon nanotubes, and a resin component such as an epoxy resin, a urethane resin, and a phenol resin. In addition, although a solvent component such as butyl carbitol acetate may be contained in the conductive paste, a solvent component may not be contained.

The conductive paste preferably contains the polycarbonate resin composition at 1-40% by mass, more preferably at 3-30% by mass, and still more preferably at 5-20% by mass of based on the total mass of the conductive paste.

In the conductive paste, the content of the conductive substance is preferably 50% by mass or more, more preferably 60% by mass or more, and still more preferably 70% by mass or more.

Furthermore, in the conductive paste, the content of the resin component is preferably 1-40% by mass, more preferably 3-30% by mass, and still more preferably 5-20% by mass.

Furthermore, in the conductive paste, the content of the solvent component is preferably 1-50% by mass, more preferably 3-45% by mass, and still more preferably 5-40% by mass.

10. Adhesive Curable Resin Composition

An adhesive curable resin composition of the present invention contains the polycarbonate resin composition, but it does not contain a solvent component. In one embodiment, the adhesive curable resin composition contains a component such as a curable monomer.

Examples of the curable monomer include those that are themselves liquid and that can dissolve the polycarbonate resin, such as an epoxy compound, styrene, and methyl methacrylate. Furthermore, these curable monomers are also useful in that they can form a composite resin composition with the polycarbonate resin (A) through curing reaction.

The adhesive curable resin composition preferably contains the polycarbonate resin composition at 1% by mass or more, more preferably at 5% by mass or more, and still more preferably at 10% by mass or more based on the total mass of the adhesive curable resin composition.

Moreover, the content of the curable monomer in the adhesive curable resin composition is preferably 50% by mass or more, more preferably 60% by mass or more, and still more preferably 70% by mass or more.

11. Base Material

Examples of the base material to which the polycarbonate resin composition of the present invention can be applied include those formed of stainless steel and other metals, glass base materials, resin (plastic) base materials, rubber base materials, and glass fiber composite base materials (including epoxy resins) that can be used as flexible substrates (FPC) and other electronic substrates.

12. Properties of Polycarbonate Resin Composition and (Coating) Resin Solution (i) Viscosity-Average Molecular Weight (Mv)

In one embodiment of the invention, the viscosity-average molecular weight (Mv) of the polycarbonate resin and the polycarbonate resin composition may be 10,000-60,000. According to the present invention, the viscosity-average molecular weight (Mv) of the polycarbonate resin and the polycarbonate resin composition may preferably be 14,000-55,000, more preferably 16,000-50,000, and still more preferably 18,000-45,000. In a preferred embodiment of the invention, the viscosity-average molecular weight (Mv) of the polycarbonate resin and the polycarbonate resin composition may be 20,000-40,000.

(ii) Mass-Average Molecular Weight (Mw)

The mass-average molecular weight (Mw) may be increased by preparing, coating, and air-drying a coating resin solution containing the polycarbonate resin composition, and then subjecting the coating resin solution to a heat drying treatment. Specifically, it is considered that a cross-linked composition in which the polycarbonate resin composition is at least partially cross-linked can be formed by performing the above treatment (e.g., Examples 12 and 13 below). As mentioned above, a silane coupling agent (B) is used in the present invention, and this is considered to contribute to the formation of the cross-linked composition. For example, the molecular weight (Mw) may be increased by formation of a chemical bond between a terminal group or the like partially present in the polycarbonate resin (A) and an active group of the silane coupling agent.

EXAMPLES

Hereinafter, examples and comparative examples will be described. The properties of the resin compositions in the examples and comparative examples were measured as follows.

<Viscosity-Average Molecular Weight (Mv)>

The viscosity-average molecular weight of the resin was measured as follows.

Measurement equipment: Ubbelohde capillary viscometer

Solvent: Dichloromethane

Concentration of resin solution: 0.5 grams/deciliter

Measurement temperature: 25° C.

Measurement was performed under the above conditions to determine the intrinsic viscosity [η] deciliter/gram at a Huggins' constant of 0.45 and the viscosity-average molecular weight was calculated by the following formula.

$$\eta = 1.23 \times 10^{-4} \times Mv^{0.83}$$

<Adhesiveness to Base Material>

The polycarbonate resin composition was coated onto a stainless steel plate and glass base material (coating thickness: 60 μm), air-dried, and then dried at 140° C. for 12 hours to produce a laminate having a layer of a coating film consisting of the polycarbonate resin composition.

The obtained laminate was subjected to an adhesion test employing the cross-cut (spaced at 1 mm) method for adhesion in accordance with JIS K5600-5-6, using a 24 mm wide cellophane tape (registered trademark) (adhesive strength 4.01 N/10 mm) manufactured by Nichiban Co., Ltd. that complies with the cross-cut test to evaluate the adhesiveness to the base material based on the JIS classification index, using a numerical scale of 0 (no peeling) to 5 (almost the entire surface was peeled off).

<Molecular Weight Stability>

The polycarbonate resin composition was dried on a PFA petri dish (petri dish made of an ethylene tetrafluoride-perfluoroalkoxy ethylene copolymer resin) at 140° C. for 12 hours to measure the Mw of the dried resin composition. Based on the Mw of the polycarbonate resin used in the resin composition and the Mw of the dried resin composition, those whose Mw decreased by 3,000 or more after drying were considered defective, and those whose Mw decreased by less than 3,000 were considered favorable.

Mw was measured as follows.

<Mass-Average Molecular Weight (Mw)>

Measurement Conditions for Gel Permeation Chromatography (GPC) Analysis

The mass-average molecular weights (Mw) of the polycarbonate resin and the polycarbonate resin composition were determined by gel permeation chromatography analysis performed under the conditions shown below.

Equipment used: Alliance HPLC System manufactured by Waters Corporation

Columns: Two Shodex 805L columns manufactured by Showa Denko K.K.

Eluent: Chloroform

Flow rate: 1.0 ml/min

Sample: 0.25 w/v % chloroform solution sample

Detection: UV detection at 254 nm

The GPC analysis described above gave mass-average molecular weights (Mw) in terms of polystyrene (PS).

<Examples of Polycarbonate Resin Synthesis>

(Synthesis of Polycarbonate Resin (A-1))

Into 530 ml of 9 w/w % aqueous sodium hydroxide solution and 200 ml of pure water, 90 g (0.34 mol) of 1,1-bis(4-hydroxyphenyl)cyclohexane (hereinafter abbreviated as "BPZ": manufactured by Honshu Chemical Industry Co., Ltd.), 1.65 g (0.011 mol) of PTBP (p-tert-butylphenol), and 0.3 g of hydrosulfite were dissolved.

To this, 300 ml of methylene chloride was added, and while stirring, 46.5 g of phosgene was blown therein over about 30 minutes while keeping the temperature at 15-20° C.

After the phosgene blowing, 100 ml of 9 w/w % aqueous sodium hydroxide solution was added, and the reaction solution was emulsified by vigorous stirring. Then, 0.5 ml of triethylamine was added as a polymerization catalyst, and the mixture was stirred at 20-30° C. for about 40 minutes to allow polymerization.

After the polymerization, the reaction solution was separated into an aqueous phase and an organic phase, the organic phase was neutralized with phosphoric acid, and repeatedly rinsed with water until the conductivity of the wash liquid (aqueous phase) became 10 μS/cm or less. The resulting polymer solution was dropped into warm water kept at 60° C. to remove the solvent by evaporation to obtain white powdery precipitate. The obtained precipitate was filtered and dried at 105° C. for 24 hours to use the resulting polycarbonate resin (A-1).

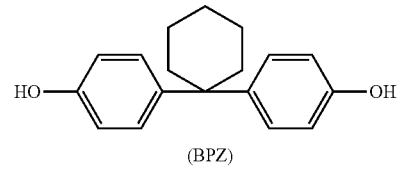 [SMILES: Oc1ccc(C2(c3ccc(O)cc3)CCCCC2)cc1]

(BPZ)

(Synthesis of Polycarbonate Resin (A-2))

Polycarbonate resin (A-2) was used, which was obtained in the same manner as polycarbonate resin (A-1) except that the amount of PTBP was changed to 0.51 g.

(Synthesis of Polycarbonate Resin (A-3))

Polycarbonate resin (A-3) was used, which was obtained in the same manner as polycarbonate resin (A-1) except that 97 g of 1,1-bis(4-hydroxyphenyl)-1-phenylethane (hereinafter abbreviated as "BPAP": manufactured by Honshu Chemical Industry Co., Ltd.) was used instead of BPZ and the amount of PTBP was changed to 1.93 g.

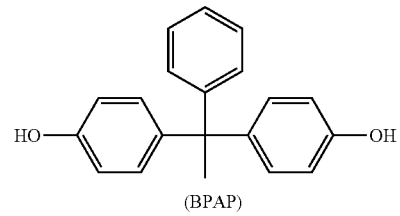 [SMILES: CC(c1ccccc1)(c1ccc(O)cc1)c1ccc(O)cc1]

(BPAP)

(Synthesis of Polycarbonate Resin (A-4))

Polycarbonate resin (A-4) was used, which was obtained in the same manner as polycarbonate resin (A-1) except that 118 g of 1,1-bis(4-hydroxyphenyl)cyclododecane (hereinafter abbreviated as "BPCD": manufactured by Honshu Chemical Industry Co., Ltd.) was used instead of BPZ and the amount of PTBP was changed to 1.42 g.

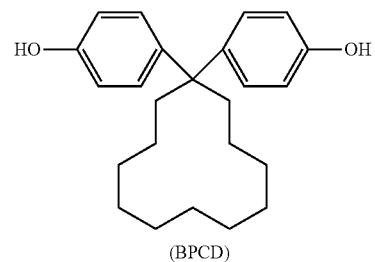

(BPCD)

(Synthesis of Polycarbonate Resin (A-5))

Into 530 ml of 9 w/w % aqueous sodium hydroxide solution and 200 ml of pure water, 51.5 g (0.20 mol) of 2,2-bis(4-hydroxy-3-methylphenyl)propane (hereinafter abbreviated as "BPC": manufactured by Honshu Chemical Industry Co., Ltd.), 30.5 g (0.13 mol) of 2,2-bis(4-hydroxyphenyl)propane (hereinafter abbreviated as "BPA"; manufactured by Mitsubishi Chemical Corporation), 1.56 g (0.010 mol) of PTBP, and 0.3 g of hydrosulfite were dissolved.

To this, 200 ml of methylene chloride was added and, while stirring, 0.08 g of benzyltriethylammonium chloride (hereinafter abbreviated as "TEBAC") was added. Then, while keeping the temperature at 15-20° C., 46.5 g of phosgene was blown therein over about 30 minutes.

After the phosgene blowing, 100 ml of 9 w/w % aqueous sodium hydroxide solution was added, and the reaction solution was emulsified by vigorous stirring. Then, 0.5 ml of triethylamine was added as a polymerization catalyst, and the mixture was stirred at 20-30° C. for about 40 minutes to allow polymerization.

After the polymerization, the reaction solution was separated into an aqueous phase and an organic phase, the organic phase was neutralized with phosphoric acid, and repeatedly rinsed with water until the conductivity of the wash liquid (aqueous phase) became 10 μS/cm or less. The resulting polymer solution was dropped into warm water kept at 60° C. to remove the solvent by evaporation to obtain white powdery precipitate. The obtained precipitate was filtered and dried at 105° C. for 24 hours to use the resulting polycarbonate resin (A-5).

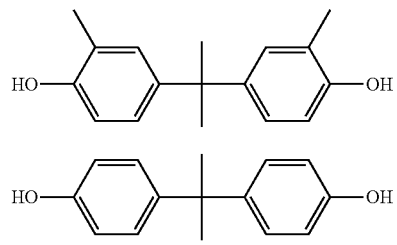

(BPC)

(BPA)

(Synthesis of Polycarbonate Resin (A-6))

Polycarbonate resin (A-6) was used, which was obtained in the same manner as polycarbonate resin (A-1) except that 48.7 g of BPAP and 45.3 g (0.17 mol) of 2,2-bis(4-hydroxyphenyl)-4-methylpentane (hereinafter abbreviated as "MIBK": manufactured by Honshu Chemical Industry Co., Ltd.) were used instead of BPZ and the amount of PTBP was changed to 1.68 g.

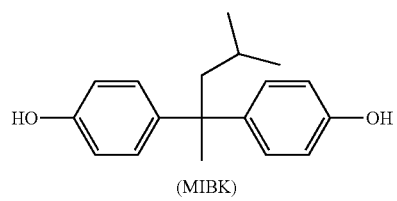 [SMILES: CC(C)CC(C)(c1ccc(O)cc1)c1ccc(O)cc1]

(MIBK)

(Synthesis of Polycarbonate Resin (A-7))

Polycarbonate resin (A-7) was used, which was obtained in the same manner as polycarbonate resin (A-5) except that the amounts of BPC and BPA were changed to 50.8 g and 30.2 g, respectively, 2.03 g (0.20 mol) of p-hydroxyphenethyl alcohol (hereinafter abbreviated as "PHEP"; manufactured by Otsuka Chemical Co. Ltd.) was also used, and PTBP was not used.

(Synthesis of Polycarbonate Resin (A-8))

Polycarbonate resin (A-8) was used, which was obtained in the same manner as polycarbonate resin (A-7) except that 78.6 g (0.23 mol) of 2,2-bis(4-hydroxyphenyl)hexafluoropropane (hereinafter abbreviated as "BPAF": manufactured by Central Glass Co., Ltd.) was used instead of BPC and the amounts of BPA and PHEP were changed to 22.9 g and 0.92 g, respectively.

The compositions and physical properties of the polycarbonate resins (A-1) to (A-8) are shown in Table 1.

TABLE 1

|  | Main skeleton | Terminal structure | Mv | Mw |
|---|---|---|---|---|
| A-1 | PCZ | PTBP | 21,200 | 58,800 |
| A-2 | PCZ | PTBP | 51,000 | 166,700 |
| A-3 | BPAP | PTBP | 20,600 | 55,900 |
| A-4 | BPCD | PTBP | 18,300 | 62,000 |
| A-5 | BPC/BPA | PTBP | 26,000 | 60,750 |
| A-6 | MIBK/BPAP | PTBP | 23,900 | 64,000 |
| A-7 | BPC/BPA | PHEP | 25,500 | 56,400 |
| A-8 | BPAF/BPA | PHEP | 27,300 | 95,000 |

Example 1

A resin composition of 10 parts by mass of polycarbonate resin (A-1) and 0.05 parts by mass of silane coupling agent (B-1) (0.5 parts by mass per 100 parts by mass of polycarbonate resin) was dissolved in 55 parts by mass of toluene to prepare a solution of the polycarbonate resin composition.

Examples 2-15, Comparative Examples 1-5

Solutions of polycarbonate resin compositions were prepared in the same manner as in Example 1 except that the type of the polycarbonate resin or the parts by mass of the silane coupling agent was changed as shown in Table 2.

The compositions and evaluation results of the polycarbonate resin compositions of Examples 1-15 and Comparative examples 1-5 are shown in Table 2.

TABLE 2

|  | Polycarbonate resin (A) | | Silane coupling agent (B) | | Adhesiveness to base material | | Molecular weight stability | |
|---|---|---|---|---|---|---|---|---|
|  | Type | Parts by mass | Type | Parts by mass | Stainless steel | Glass | Mw | Evaluation |
| Example 1 | A-1 | 100 | B-1 | 0.5 | 0 | 0 | 58,800 | Favorable |
| Example 2 | A-1 | 100 | B-1 | 0.1 | 1 | 0 | 58,800 | Favorable |
| Example 3 | A-1 | 100 | B-1 | 2.0 | 0 | 0 | 59,100 | Favorable |
| Example 4 | A-2 | 100 | B-1 | 0.5 | 0 | 0 | 166,700 | Favorable |
| Example 5 | A-3 | 100 | B-1 | 0.5 | 0 | 0 | 57,300 | Favorable |
| Example 6 | A-4 | 100 | B-2 | 0.5 | 0 | 0 | 62,100 | Favorable |
| Example 7 | A-5 | 100 | B-1 | 0.5 | 0 | 0 | 60,000 | Favorable |
| Example 8 | A-6 | 100 | B-2 | 0.5 | 0 | 0 | 64,100 | Favorable |
| Example 9 | A-7 | 100 | B-1 | 0.5 | 0 | 0 | 56,300 | Favorable |
| Example 10 | A-7 | 100 | B-1 | 0.1 | 0 | 1 | 56,600 | Favorable |
| Example 11 | A-7 | 100 | B-1 | 2.0 | 0 | 0 | 56,400 | Favorable |
| Example 12 | A-7 | 100 | B-2 | 0.5 | 0 | 0 | 58,000 | Favorable |
| Example 13 | A-7 | 100 | B-2 | 2.0 | 0 | 0 | 61,300 | Favorable |

TABLE 2-continued

|  | Polycarbonate resin (A) | | Silane coupling agent (B) | | Adhesiveness to base material | | Molecular weight stability | |
| --- | --- | --- | --- | --- | --- | --- | --- | --- |
|  | Type | Parts by mass | Type | Parts by mass | Stainless steel | Glass | Mw | Evaluation |
| Example 14 | A-7 | 100 | B-3 | 0.5 | 0 | 1 | 56,600 | Favorable |
| Example 15 | A-8 | 100 | B-1 | 0.5 | 0 | 0 | 95,000 | Favorable |
| Comparative example 1 | A-1 | 100 | — | — | 5 | 5 | 58,800 | Favorable |
| Comparative example 2 | A-1 | 100 | B-1 | 0.1 | 5 | 5 | 58,800 | Favorable |
| Comparative example 3 | A-1 | 100 | B-4 | 2.0 | 5 | 5 | 58,800 | Favorable |
| Comparative example 4 | A-1 | 100 | B-5 | 0.5 | 0 | 0 | 44,600 | Defective |
| Comparative example 5 | A-1 | 100 | — | — | 3 | 5 | 56,400 | Favorable |

The abbreviations B-1 to B-5 in Table 2 denote the following.

B-1: 3-Glycidyloxypropyltrimethoxysilane (manufactured by Tokyo Chemical Industry Co., Ltd.)
B-2: 3-(Triethoxysilyl)propyl isocyanate (manufactured by Tokyo Chemical Industry Co., Ltd.)
B-3: Vinyltrimethoxysilane (manufactured by Tokyo Chemical Industry Co., Ltd.)
B-4: 3-(Trimethoxysilyl)propyl methacrylate (manufactured by Tokyo Chemical Industry Co., Ltd.)
B-5: 3-Aminopropyltrimethoxysilane (manufactured by Tokyo Chemical Industry Co., Ltd.)

As described above, the resin composition of the present invention can improve the adhesiveness between a coating film and a base material and is also useful as a blend resin composition of the polycarbonate resin and other resin.

INDUSTRIAL APPLICABILITY

The resin composition of the present invention can be used as a coating resin solution for protecting articles. It is particularly suitable for coatings in fields where durability in daily life is required, such as IC cards and security cards.

The invention claimed is:

1. A polycarbonate resin composition comprising a polycarbonate resin (A) comprising a structural unit represented by General formula (1) below and a silane coupling agent (B) represented by General formula (2) below, wherein the polycarbonate resin composition comprises 0.06 parts by mass or more of the silane coupling agent (B) per 100 parts by mass of the polycarbonate resin (A):

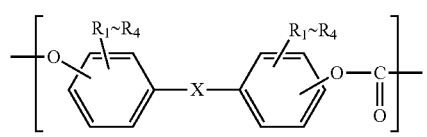

(1)

(in Formula (1),
$R_1$-$R_4$ each independently represent hydrogen, fluorine, chlorine, bromine, iodine, or an optionally substituted C1-C20 alkyl group, C6-C12 aryl group, C2-C12 alkenyl group, C1-C5 alkoxy group, or C7-C17 aralkyl group,
X represents a single bond, —O—, —S—, —SO—, —$SO_2$—, —CO—, or a divalent group represented by any of General formulae (4)-(9) below),

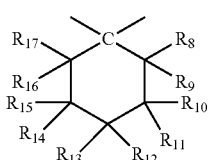

(4)

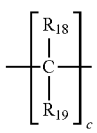

(5)

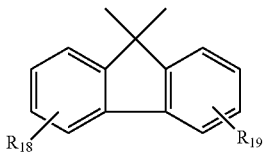

(6)

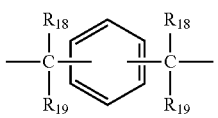

(7)

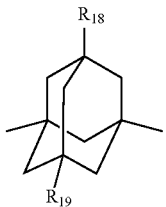

(8)

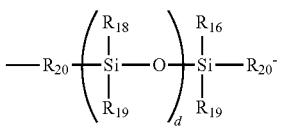

(9)

(in General formula (4), $R_8$-$R_{17}$ each independently represent hydrogen or a C1-C3 alkyl group, where at least one of $R_8$-$R_{17}$ represents a C1-C3 alkyl group; and
in General formulae (5) to (9),
$R_{18}$ and $R_{19}$ each independently represent hydrogen, a halogen, an optionally substituted C1-C20 alkyl group, an optionally substituted C1-C5 alkoxy group, an optionally substituted C6-C12 aryl group, an optionally substituted C7-C17 aralkyl group, or an optionally substituted C2-C15 alkenyl group, or $R_{18}$ and $R_{19}$ bind with each other to form a C3-C20 carbon ring or a C1-C20 heterocyclic ring, $R_{20}$ represents an optionally substituted C1-C9 alkylene group, c represents an integer from 0 to 20, and d represents an integer from 1 to 500);

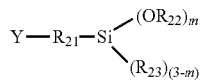

(2)

(in General formula (2), $R_{21}$ represents a C1-C4 alkylene group or a phenylene group, $R_{22}$ each independently represent a C1-C4 alkyl group, $R_{23}$ each independently represent a hydroxyl group or a C1-C4 alkyl group, Y represents an active group comprising an epoxy group, an isocyanate group, a vinyl group, a styryl group, an acryloyl group, a ureido group, an isocyanurate group, or a mercapto group, and m each independently represent an integer from 1-3), wherein the terminal structure of the polycarbonate resin (A) is represented by General formula (3) below:

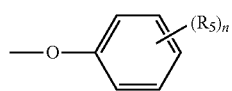

(3)

(in General formula (3), $R_5$ each independently represent a C1-C8 alkyl group, which may be substituted by a hydroxyl group, and n represents an integer from 0 to 5), the polycarbonate resin (A) comprises the terminal structure (3) represented by General formula (3) at a percentage of 0.5 mol % or more and 12 mol % or less, based on the total moles of the structural unit represented by General formula (1) and the terminal structure (3); and the polycarbonate resin composition comprises no photoinitiator or polymerization precursor.

2. The polycarbonate resin composition according to claim 1, wherein $R_5$ each independently represents a C1-C6 alkyl group, which may be substituted by a hydroxyl group.

3. The polycarbonate resin composition according to claim 1, wherein X in General formula (1) above represents —O—, —S—, or General formula (4) or (5) above.

4. The polycarbonate resin composition according to claim 1, wherein General formula (1) above represents one or more selected from the group consisting of Formulae (10) to (22) below:

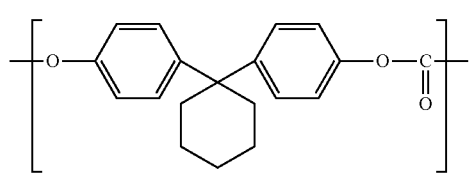

(10)

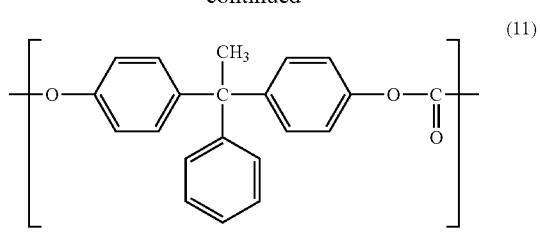

(11)

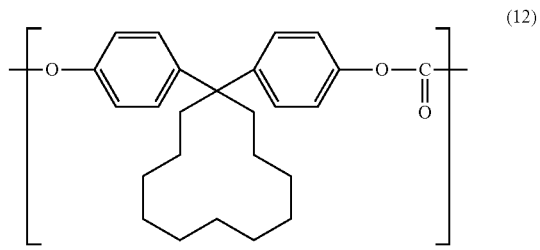

(12)

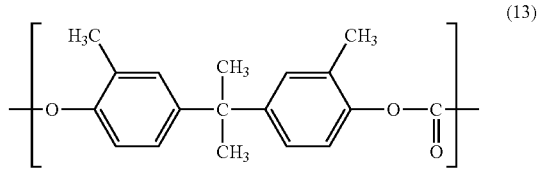

(13)

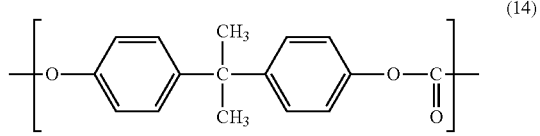

(14)

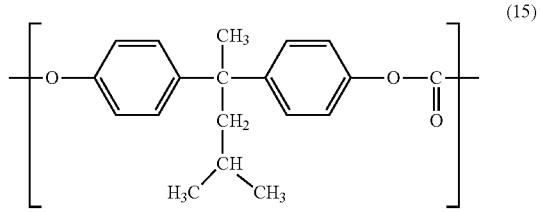

(15)

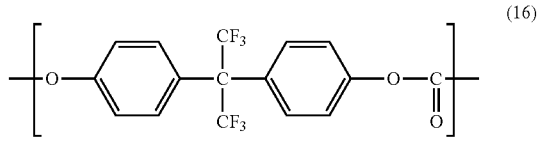

(16)

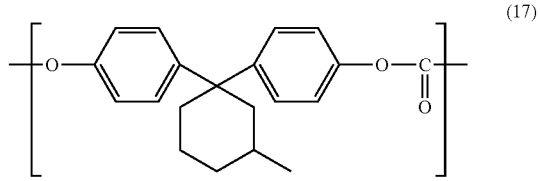

(17)

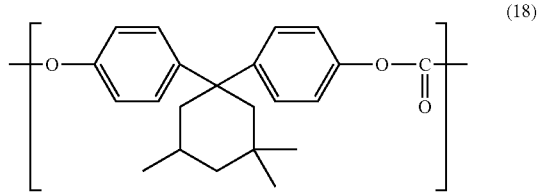

(18)

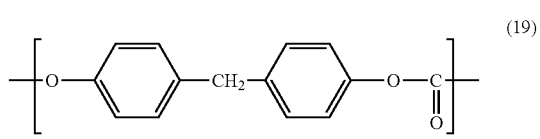

(19)

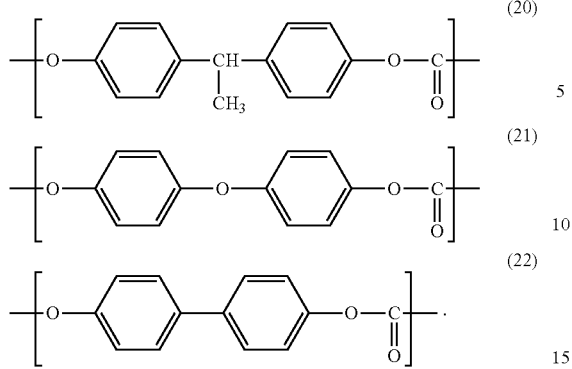

(20)

(21)

(22)

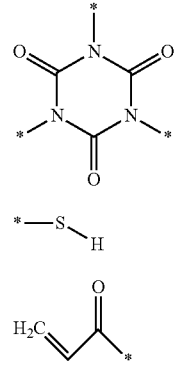

(vii)

(viii)

(ix)

5. The polycarbonate resin composition according to claim 1, wherein the active group represented by Y in General formula (2) above has at least one of an epoxy group, an isocyanate group, and a vinyl group.

6. The polycarbonate resin composition according to claim 1, wherein the active group represented by Y in General formula (2) above comprises any of Formulae (i) to (ix) below:

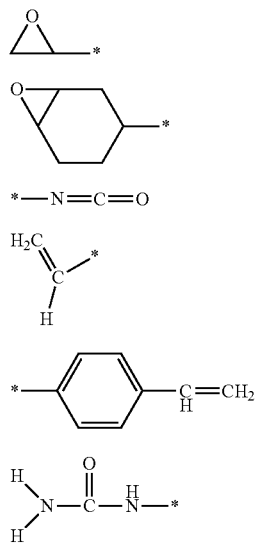

(i)
(ii)
(iii)
(iv)
(v)
(vi)

(in General formulae (i) to (ix),

* represents a bond point with $R_{21}$ in General formula (2) above).

7. The polycarbonate resin composition according to claim 1, wherein the viscosity-average molecular weight of the polycarbonate resin (A) is 10,000-60,000.

8. The polycarbonate resin composition according to claim 1, comprising 10 parts by mass or less of the silane coupling agent (B) per 100 parts by mass of the polycarbonate resin (A).

9. A film or coating comprising the polycarbonate resin composition according to claim 1.

10. A paint composition comprising the polycarbonate resin composition according to claim 1.

11. The paint composition according to claim 10, further comprising a solvent component.

12. A resin solution comprising the resin composition according to claim 1 and a non-halogenated organic solvent.

13. A coating solution comprising the resin composition according to claim 1.

14. A printing ink comprising the resin composition according to claim 1.

15. A conductive paste comprising the resin composition according to claim 1.

16. An adhesive curable resin composition, which comprises the polycarbonate resin composition according to claim 1 and which does not comprise a solvent.

* * * * *